US012015895B2

(12) United States Patent
Honda et al.

(10) Patent No.: US 12,015,895 B2
(45) Date of Patent: Jun. 18, 2024

(54) SPEAKER

(71) Applicant: Panasonic Intellectual Property Management Co., Ltd., Osaka (JP)

(72) Inventors: Kazuki Honda, Mie (JP); Masashi Nishida, Osaka (JP); Junichi Ikeda, Kyoto (JP); Ippei Kiyama, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/919,715

(22) PCT Filed: Oct. 15, 2021

(86) PCT No.: PCT/JP2021/038242
§ 371 (c)(1),
(2) Date: Oct. 18, 2022

(87) PCT Pub. No.: WO2022/102341
PCT Pub. Date: May 19, 2022

(65) Prior Publication Data

US 2023/0142560 A1 May 11, 2023

(30) Foreign Application Priority Data

Nov. 10, 2020 (JP) ................................ 2020-187266

(51) Int. Cl.
*H04R 1/38* (2006.01)
*H04R 7/12* (2006.01)

(52) U.S. Cl.
CPC ............... *H04R 1/38* (2013.01); *H04R 7/127* (2013.01); *H04R 2201/34* (2013.01)

(58) Field of Classification Search
CPC ....... H04R 1/38; H04R 2201/34; H04R 7/127
(Continued)

(56) References Cited

U.S. PATENT DOCUMENTS 4,965,839 A 10/1990 Elieli
5,875,252 A 2/1999 Lesage
(Continued)

FOREIGN PATENT DOCUMENTS

JP S58-186298 A 10/1983
JP H02-031599 A 2/1990
(Continued)

OTHER PUBLICATIONS

International Preliminary Report on Patentability dated May 25, 2023 issued in International Patent Application No. PCT/JP2021/038242, with English translation.
(Continued)

*Primary Examiner* — Norman Yu
(74) *Attorney, Agent, or Firm* — Rimon P.C.

(57) ABSTRACT

A speaker includes: a diaphragm having a dome shape; a tubular member having the diaphragm disposed inside, and having an inner diameter increasing toward a front; and a phase plug. The phase plug includes: a front surface, a rear surface facing a central portion on a front surface of the diaphragm at a constant interval in parallel, and a side surface connecting the front surface and the rear surface. A front surface of the phase plug is larger than a rear surface of the phase plug as viewed in a front-rear direction of a speaker. At least a part of a side surface of the phase plug has an inclined surface extending outward while extending forward, faces an inner circumferential surface of the tubular member and a front surface of the diaphragm, and directs a sound wave generated from the diaphragm toward an inner circumferential surface of the tubular member.

11 Claims, 18 Drawing Sheets

(58) Field of Classification Search
USPC .................................... 381/343, 97, 98, 337
See application file for complete search history.

(56) References Cited

U.S. PATENT DOCUMENTS

| | | | |
|---|---|---|---|
| 2011/0085692 A1 | 4/2011 | Voishillo | |
| 2011/0168480 A1 | 7/2011 | Sterling et al. | |
| 2012/0027238 A1 | 2/2012 | Voishillo | |
| 2013/0182879 A1 | 7/2013 | Graber et al. | |
| 2018/0054671 A1 | 2/2018 | Voishvillo | |
| 2019/0028801 A1 * | 1/2019 | Chen ........................ | H04R 9/06 |

FOREIGN PATENT DOCUMENTS

| | | |
|---|---|---|
| JP | 2012-500535 A | 1/2012 |
| JP | 2012-249128 A | 12/2012 |
| WO | 2012/164866 A1 | 12/2012 |

OTHER PUBLICATIONS

International Search Report issued in International Patent Application No. PCT/JP2021/038242, mailed Jan. 11, 2022; with English translation.

* cited by examiner

SPEAKER

CROSS-REFERENCE OF RELATED APPLICATIONS

This application is the U.S. National Phase under 35 U.S.C. § 371 of International Patent Application No. PCT/JP2021/038242, filed on Oct. 15, 2021, which in turn claims the benefit of Japanese Patent Application No. 2020-187266, filed on Nov. 10, 2020, the entire disclosures of which Applications are incorporated by reference herein.

TECHNICAL FIELD

The present disclosure relates to a speaker.

BACKGROUND ART

For example, Patent Document 1 discloses a speaker including a dome-shaped diaphragm and a phase plug disposed in front of a front surface of the diaphragm. A phase of a sound wave generated from a part of the diaphragm facing the phase plug is matched with a phase of a sound wave generated from another part of the diaphragm. Accordingly, a decrease in sound pressure is suppressed, and sound quality is improved.

PRIOR ART DOCUMENTS

Patent Documents

Patent Document 1: U.S. Pat. No. 5,875,252

SUMMARY OF THE INVENTION

Problems to be Solved by the Invention

An object of the present disclosure is to further improve sound quality in a speaker including a dome-shaped diaphragm and a phase plug disposed in front of the diaphragm.

Means for Solving the Problems

In order to solve the above problem, according to one aspect of the present disclosure, provided is a speaker including: a diaphragm having a dome shape curved forward in a protruding manner; a tubular member having the diaphragm disposed inside, the tubular member having an inner diameter increasing toward a front; and a phase plug disposed in front of a front surface of the diaphragm. The phase plug includes: a front surface facing forward, a rear surface facing a central portion on a front surface of the diaphragm at a constant interval in parallel, and a side surface connecting the front surface and the rear surface. The front surface of the phase plug is larger than a rear surface of the phase plug as viewed in a front-rear direction of a speaker. At least a part of the side surface of the phase plug has an inclined surface that extends outward while extending forward, faces an inner circumferential surface of the tubular member and a front surface of the diaphragm, and directs a sound wave generated from the diaphragm toward an inner circumferential surface of the tubular member.

In addition, according to another aspect of the present disclosure, provided is a speaker including: a diaphragm having a dome shape curved forward in a protruding manner; and a phase plug disposed in front of a front surface of the diaphragm. The phase plug includes: a front surface facing forward, a rear surface facing a central portion on a front surface of the diaphragm at a constant interval in parallel, and a side surface connecting the front surface and the rear surface. The phase plug includes a plurality of ribs on the side surface. Each of the plurality of ribs includes a facing surface that faces a front surface of the diaphragm at the constant interval in parallel. Each of the plurality of ribs protrudes outward beyond an outer circumferential edge of the front surface as viewed in a front-rear direction of a speaker.

Effects of the Invention

According to the present disclosure, sound quality can be further improved in a speaker including a dome-shaped diaphragm and a phase plug disposed in front of the diaphragm.

MODES FOR CARRYING OUT THE INVENTION

Hereinafter, embodiments will be described in detail with reference to the drawings as appropriate. However, a detailed description more than necessary may be omitted. For example, a detailed description of already well-known matters and a redundant description of substantially the same configuration may be omitted. This is to avoid the unnecessary redundancy of the following description and to facilitate understanding by those skilled in the art.

It should be noted that the inventors provide the accompanying drawings and the following description in order for those skilled in the art to fully understand the present disclosure, and do not intend to limit the subject matter described in the claims by the accompanying drawings and the following description.

First Embodiment

Figure 1:
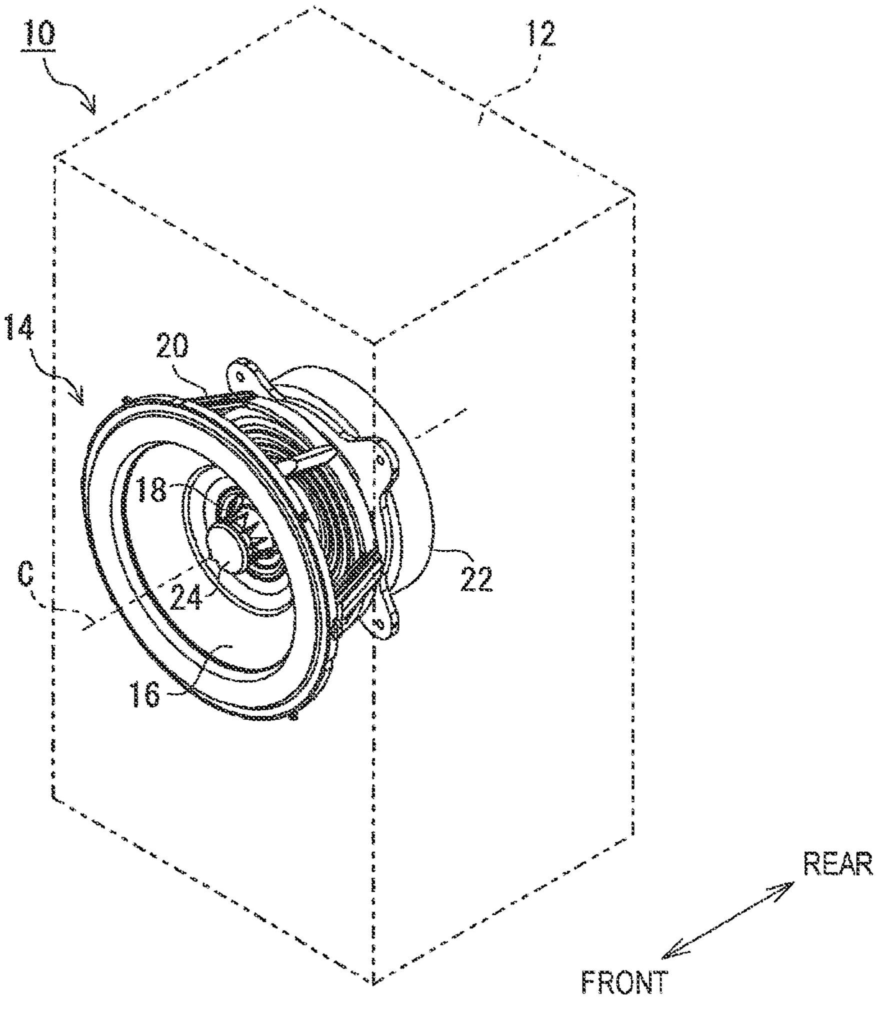
FIG. 1 is a schematic perspective view showing the inside of a speaker according to a first embodiment of the present disclosure.
Figure 2:
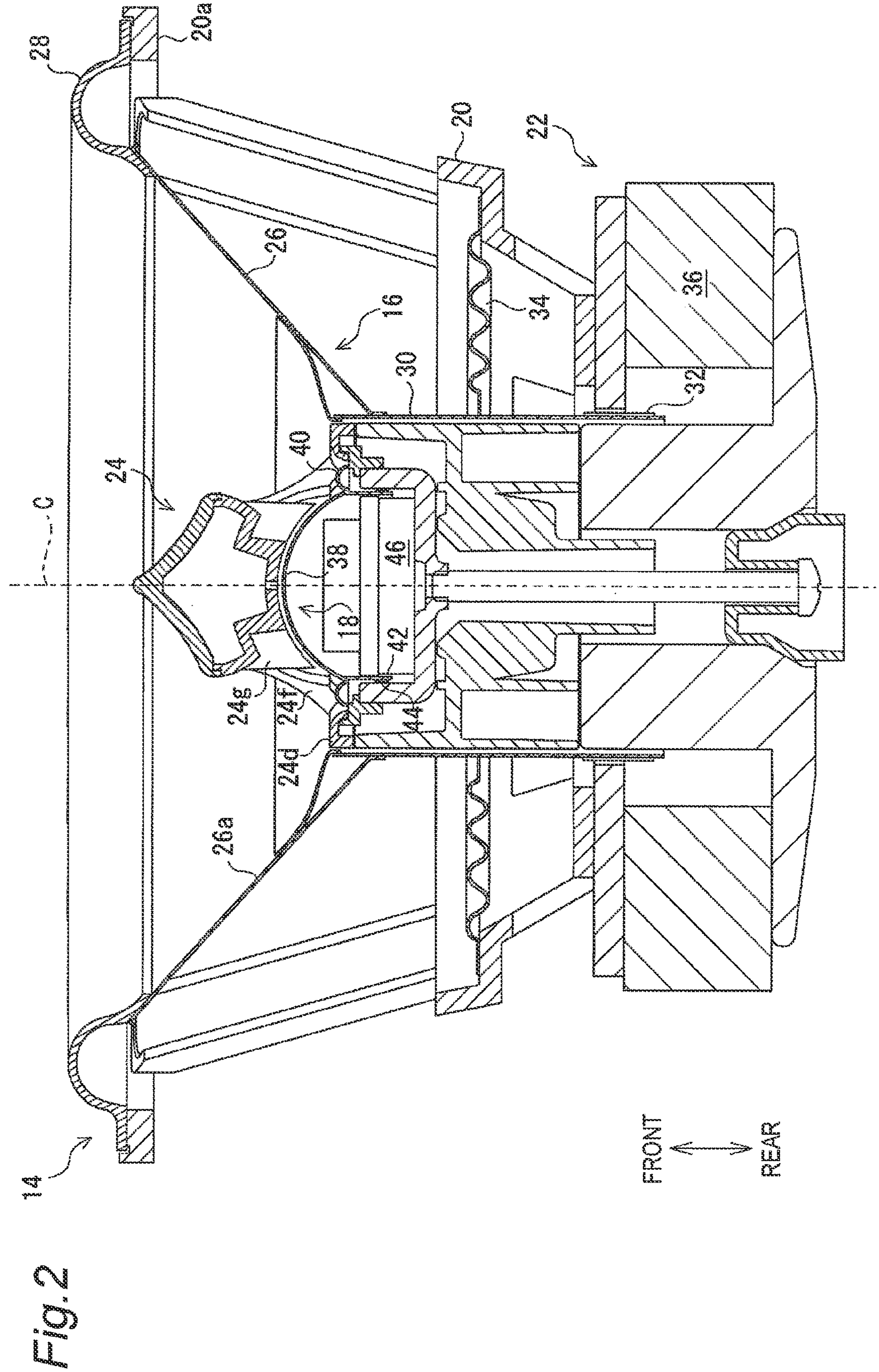
FIG. 2 is a cross-sectional view of a sound generation unit of the speaker according to the first embodiment.
Figure 3:
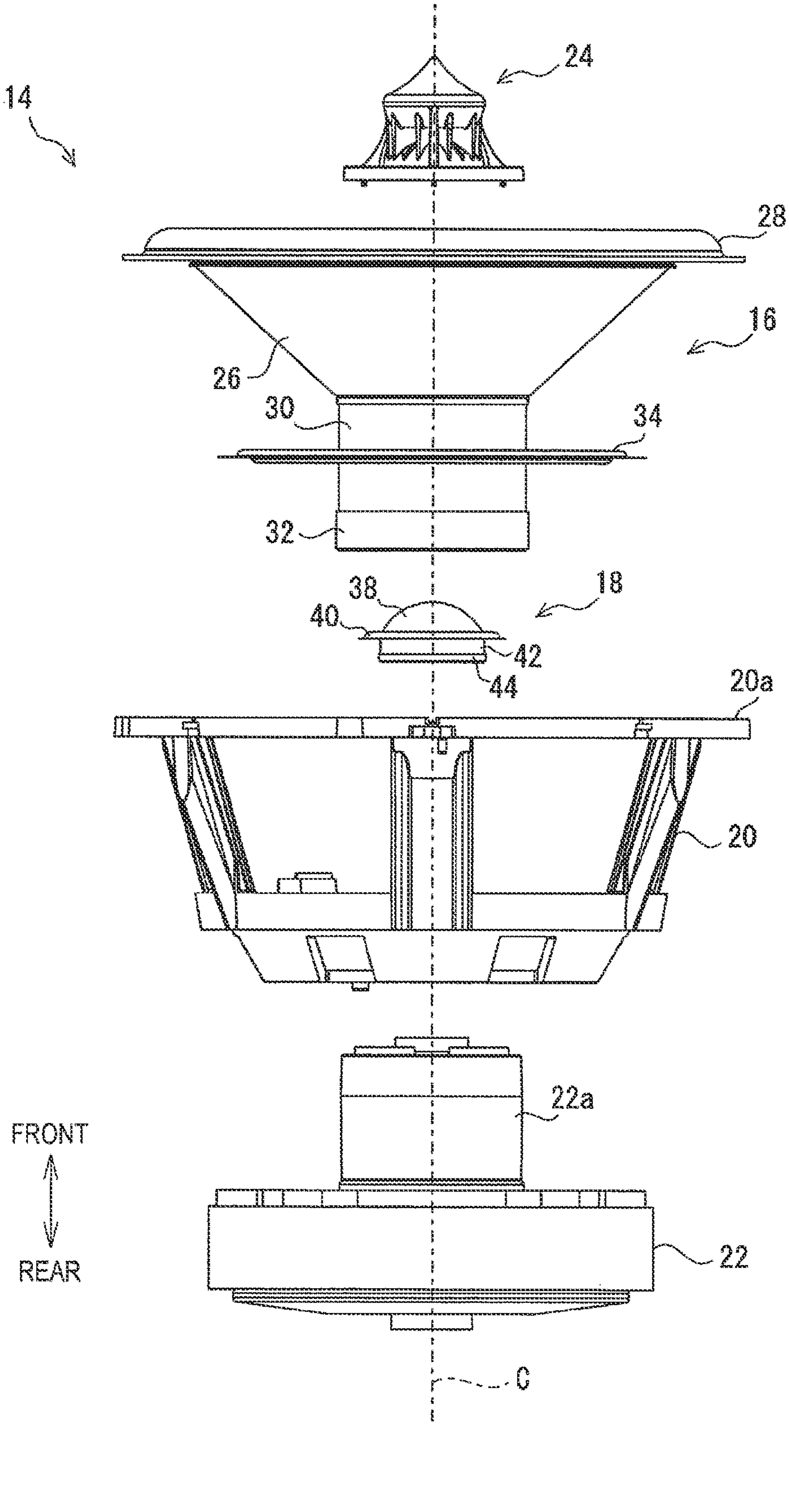
FIG. 3 is an exploded view of the sound generation unit of the speaker according to the first embodiment.

FIG. 1 is a schematic perspective view showing the inside of a speaker according to a first embodiment of the present disclosure. FIG. 2 is a cross-sectional view of the sound generation unit of the speaker according to the first embodiment. FIG. 3 is an exploded view of the sound generating unit.

As shown in FIG. 1, the speaker 10 includes an enclosure 12 and a sound generation unit 14 provided in the enclosure 12. In the case of the first embodiment, the speaker 10 is a coaxial speaker, and as shown in FIGS. 2 and 3, the sound generation unit 14 includes a woofer 16 and a tweeter 18. In addition, the sound generation unit 14 includes a frame 20 supporting the woofer 16, and a magnetic circuit 22 supporting the tweeter 18 and the frame 20. Furthermore, the sound generation unit 14 includes a phase plug 24.

In the case of the first embodiment, the woofer 16 includes a diaphragm 26, an edge for fixing a front end of the diaphragm 26 to an annular front end portion 20*a* of the frame 20, a cylindrical voice coil bobbin 30 extending from the diaphragm 26 toward the rear of the speaker 10, a voice coil 32 provided on the voice coil bobbin 30, a damper 34 supporting the voice coil bobbin 30 so as to be vibrated, and a magnet 36.

The diaphragm 26 of the woofer 16 is a tubular member whose inner diameter increases toward the front of the speaker 10, for example, a truncated conical member. The diaphragm 26 is supported on the frame 20 through the edge 28 and the damper 34 in a vibratable manner so that the central axis of the shape of the diaphragm 26 coincides with the central axis C of the speaker 10 extending in the front-rear direction of the speaker 10. Flow of a current through the voice coil 32 disposed adjacent to the magnet 36 for the woofer 16 disposed in the magnetic circuit 22 causes the voice coil bobbin 30 to vibrate in the front-rear direction. Accordingly, the diaphragm 26 of the woofer 16 connected to the voice coil bobbin 30 vibrates to generate a sound wave.

The tweeter 18 includes a diaphragm 38, an edge 40 supporting the diaphragm 38, a cylindrical voice coil bobbin 42 extending from the diaphragm 38 toward the rear of the speaker 10, a voice coil 44 provided on the voice coil bobbin 42, and a magnet 46.

The diaphragm 38 of the tweeter 18 is a dome-shaped member curved forward in a protruding manner. For example, the diaphragm 38 has a hemispherical shape. The diaphragm 38 is provided in a vibratable manner on the top surface of the cylindrical portion 22*a* of the magnetic circuit 22 through the edge 40 so that the central axis of the shape of the diaphragm 38 coincides with the central axis C of the speaker 10. As a result, the diaphragm 26 of the woofer 16 and the diaphragm 38 of the tweeter 18 are disposed coaxially (on the central axis C). It should be noted that the cylindrical portion 22*a* of the magnetic circuit 22 is disposed in the voice coil bobbin 30 of the woofer 16. Accordingly, the diaphragm 38 of the tweeter 18 is disposed in the diaphragm 26 of the woofer 16. Flow of a current through the voice coil 44 disposed adjacent to the magnet 46 for the tweeter 18 disposed in the magnetic circuit 22 causes the voice coil bobbin 42 to vibrate in the front-rear direction. Accordingly, the diaphragm 38 of the tweeter 18 connected to the voice coil bobbin 42 vibrates to generate a sound wave.

The phase plug 24 is disposed in front of the diaphragm 38 of the tweeter 18.

Figure 4:
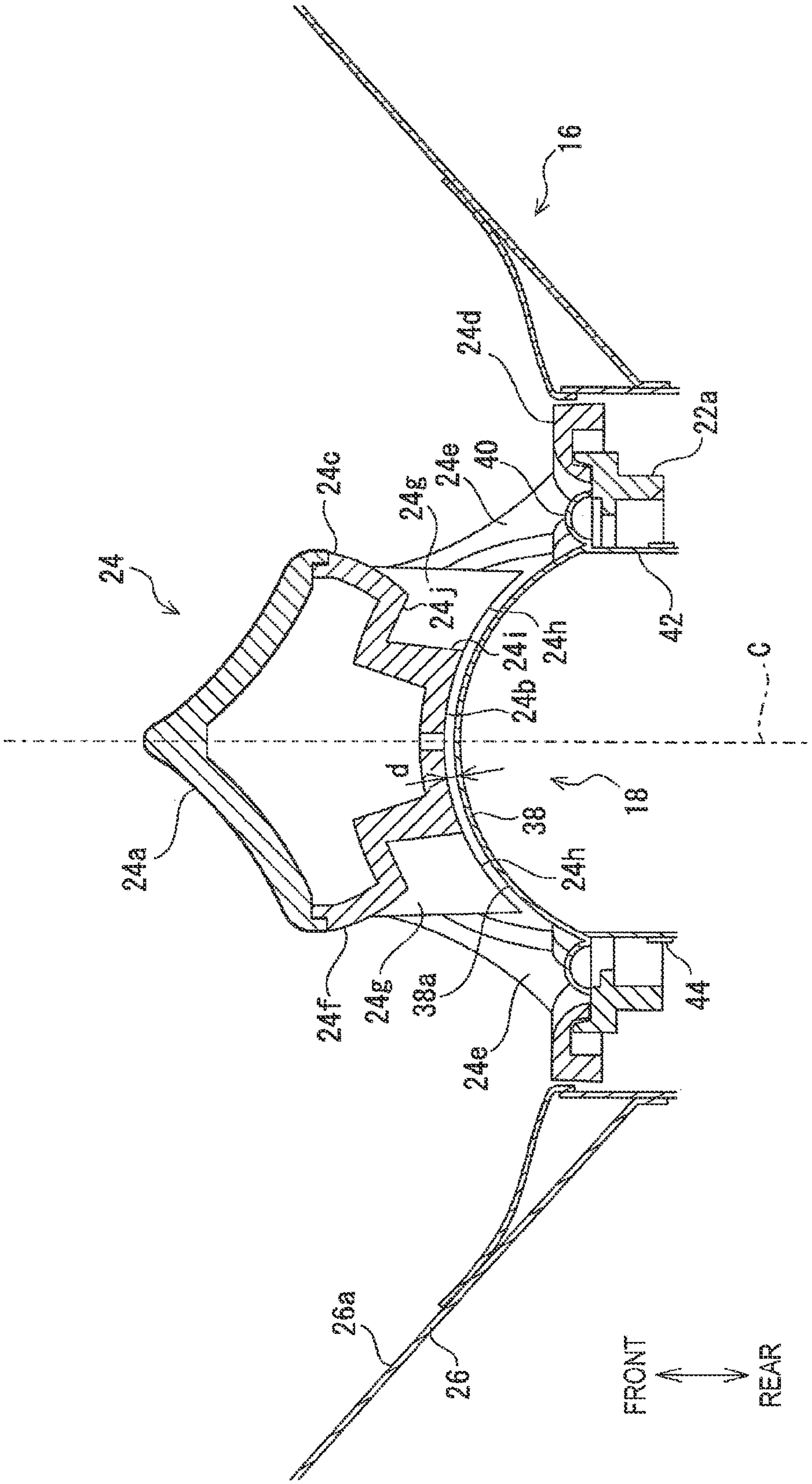
FIG. 4 is a partially enlarged cross-sectional view of the speaker including a phase plug according to the first embodiment.
Figure 5:
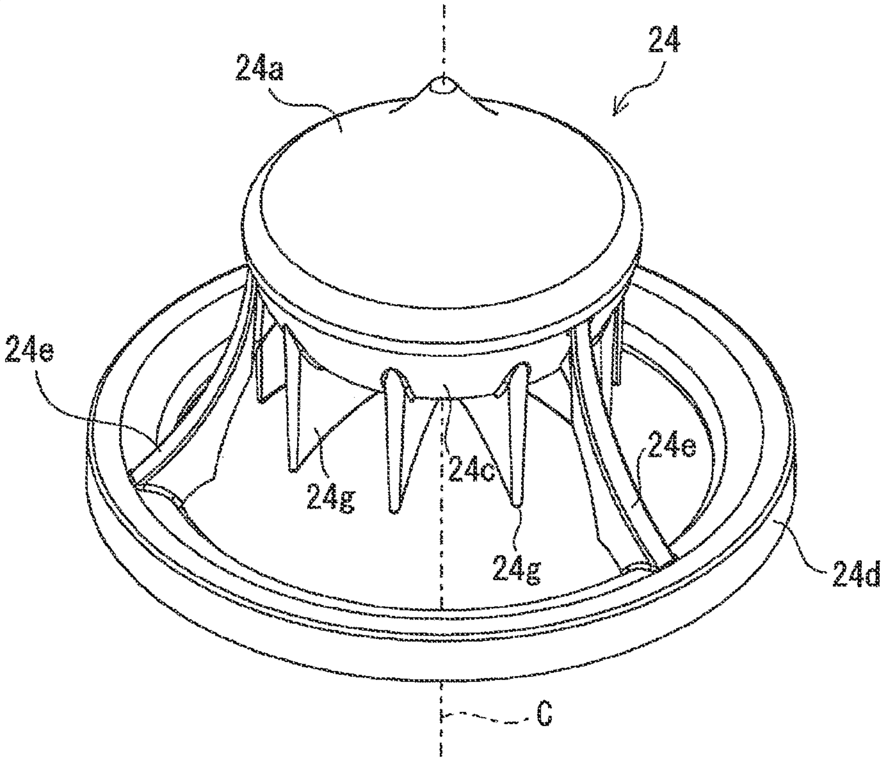
FIG. 5 is a front perspective view of the phase plug according to the first embodiment.
Figure 6:
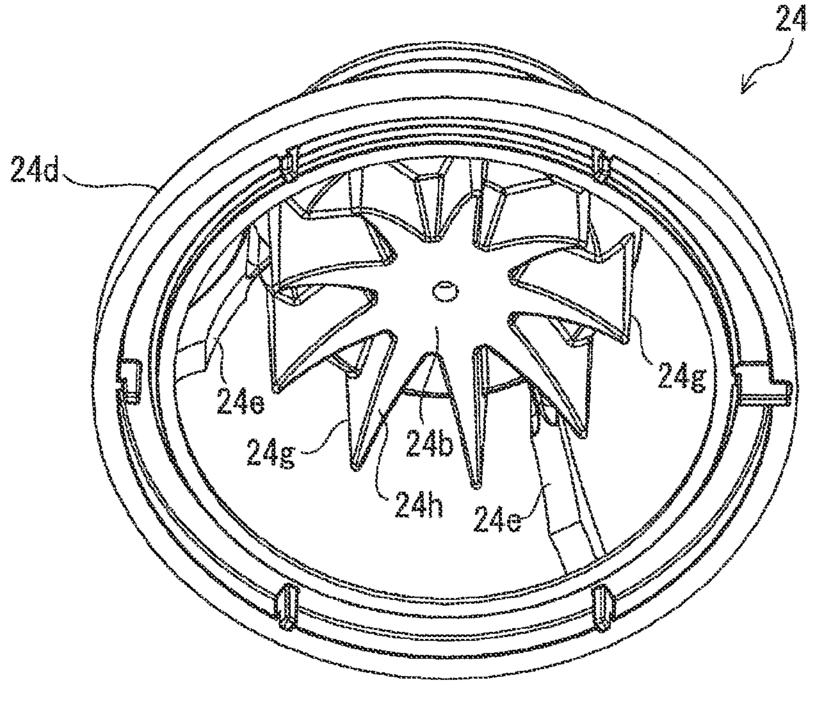
FIG. 6 is a rear perspective view of be phase plug according to the first embodiment.

FIG. 4 is a partially enlarged cross-sectional view of the speaker including the phase plug according to the first embodiment. In addition, FIGS. 5 to 8 are a front perspective view, a rear perspective view, a side view, and a rear view of the phase plug according to the first embodiment.

As shown in FIGS. 4 to 8, the phase plug 24 includes a front surface 24*a* facing forward, a rear surface 24*b* facing the front surface 38*a* of the diaphragm 38 of the tweeter 18, and a side surface 24*c* connecting the front surface 24*a* and the rear surface 24*b*. In addition, the phase plug 24 includes an annular attachment portion 24*d* attached to the top surface of the cylindrical portion 22*a* of the magnetic circuit 22, and a plurality of leg portions 24*e* connecting the side surface 24*c* and the attachment portion 24*d*. The attachment portion 24*d* is an annular portion positioned outside the diaphragm 38 of the tweeter 18 and surrounding the diaphragm 38 as viewed in the front-rear direction of speaker 10. The leg portion 24*e* extends from the attachment portion 24*d* and supports the main portions (front surface 24*a*, rear surface 24*b*, and side surface 24*c*) of the phase plug 24 in front of the diaphragm 38 of the tweeter 18. It should be noted that the leg portion 24*e* is spaced apart from the front surface 38*a* of the diaphragm 38 as compared with the rear surface 24*b* and a facing surface of a rib described below so as not to affect sound quality.

The front surface 24*a* of the phase plug 24 is a portion of the surface viewed from the front of the speaker 10, and has a circular shape centered on the central axis C as viewed in the front-rear direction of the speaker 10. In addition, in the case of the present first embodiment, the front surface 24*a* is a conical protruding surface as viewed in a direction orthogonal to the central axis C. The conical front surface 24*a* has a conical surface curved inward in a protruding manner. In addition, as viewed in the front-rear direction, the size of the front surface 24*a* is substantially equal to the size of the diaphragm 38 of the tweeter 18. The role of the front surface 24*a* of the phase plug 24 including this conical protruding surface will be described below.

The rear surface 24*b* of the phase plug 24 is a portion of a surface of the phase plug 24 facing a central portion of the front surface 28*a* of the diaphragm 38 of the tweeter 18 at a constant interval din parallel. The interval d is, for example, 0.5 mm. The role of the rear surface 24*b* of the phase plug 24 will be described below.

The side surface 24*c* of the phase plug 24 is a portion of a surface of the phase plug 24 that connects the front surface 24*a* and the rear surface 24*b*. In the case of the present first embodiment, the front surface 24*a* of the phase plug 24 is larger than the rear surface 24*b* thereof as viewed in the front-rear direction of the speaker 10. Therefore, the side surface 24*a* of the phase plug 24 at least partially includes an inclined surface 24*f* extending outward while extending forward. As a result, the inclined surface 24*f* faces a portion of the front surface 38*a* of the diaphragm 38 not facing the rear surface 24*b* in the front-rear direction of the speaker 10, and faces the inner circumferential surface 26*a* of the diaphragm 26 of the woofer 16 in a direction orthogonal to the front-rear direction. It should be noted that in the case of the first embodiment, the inclined surface 24*f* is a part of the side surface 24*c*, and is connected to the front surface 24*a*. In addition, in the case of the present first embodiment, the inclined surface 24*f* is a curved surface curved outward in a protruding manner as viewed in a direction orthogonal to the front-rear direction. The role of the side surface 24*c* of the phase plug 24 including this inclined surface 24*f* will be described below.

Furthermore, in the case of the present first embodiment, the phase plug 24 includes a plurality of ribs 24*g* protruding rearward from the side surface 24*c* toward the front surface 38*a* of the diaphragm 38. In addition, the plurality of ribs 24*g* are plate-shaped protrusions supported by the side surface 24*c* in a cantilever manner, and extend in the radiation direction with respect to the central axis C as viewed in the front-rear direction of the speaker 10. Furthermore, each of the plurality of ribs 24*g* includes a facing surface 24*h* that faces the front surface 38*a* of the diaphragm 38 at a constant interval d in parallel. The facing surface 24*h* and the rear surface 24*b* are continuous curved surfaces. It should be noted that in the case of the present first embodiment, the plurality of ribs 24*g* do not protrude outward beyond the outer circumferential edge of the front surface 24*a* as viewed in the front-rear direction of the speaker 10.

Figure 7:
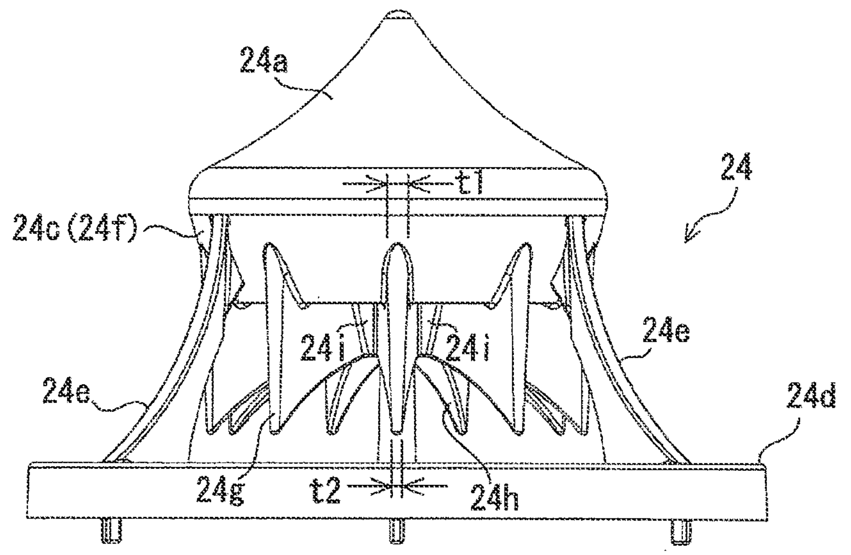
FIG. 7 is a &de view of the phase plug according to the first embodiment.

In the case of the present first embodiment, each of the plurality of ribs 24*g* has a shape whose thickness increases toward the front of the speaker 10. That is, as shown in FIG. 7, the wall thickness t1 on the front side of the plurality of ribs 24*g* is larger than the wall thickness t2 on the rear side (diaphragm 38 side).

Figure 8:
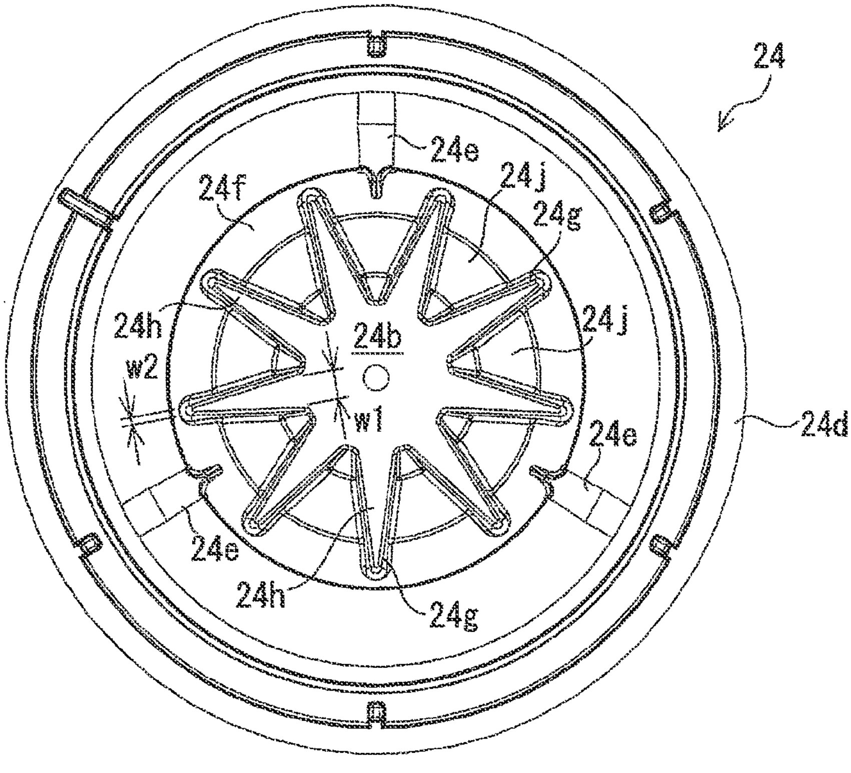
FIG. 8 is a rear view of the phase plug according to the first embodiment.

In addition, in the case of the present first embodiment, the facing surface 24*h* of each of the plurality of ribs 24*g* has a shape in which the width decreases toward the outside as viewed in the front-rear direction of the speaker 10. That is, as shown in FIG. 8, as viewed in the front-rear direction of the speaker 10, the width w1 on the center side is larger than the width w2 on the outer side.

The role of these plurality of ribs 24*g* will be described below.

Hereinafter, the role and effects of the phase plug 24 having the above-described features will be described. It should be noted that before describing the role and effects of the phase plug 24, a problem that occurs when the phase plug 24 is not present will be described as a reference.

Figure 9:
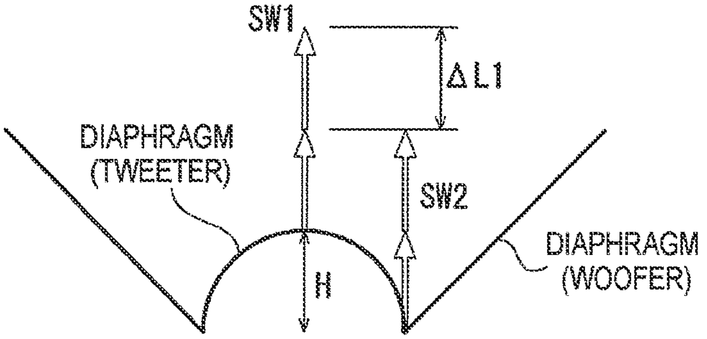
FIG. 9 is a schematic diagram of a speaker showing a first problem occurring in a speaker of a comparative example in which a phase plug is not provided.

FIG. 9 is a schematic diagram of a speaker showing a first problem occurring in a speaker of a comparative example in which a phase plug is not provided. In addition, FIG. 10 is a schematic diagram of a speaker showing a second problem occurring in the speaker of the comparative example.

As shown in FIG. 9, in the case of the speaker of the comparative example without the phase plug, the sound wave propagating forward from the dome-shaped diaphragm of the tweeter has a reaching distance different depending on the position where the sound wave is generated. For example, a reaching distance difference ΔL1 is generated between the sound wave SW1 generated from the central portion of the tweeter diaphragm and the sound wave SW2 generated from the outer circumferential portion of the tweeter diaphragm. The ΔL1 corresponds to the height H of the dome-shaped diaphragm.

Due to the reaching distance difference ΔL1, a phase shift close to 180 degrees occurs at a certain frequency at the measurement position in front of the speaker, and the sound pressure level at the frequency decreases. As a result, a user in front of the speaker may feel insufficient sound pressure in a certain sound range.

Figure 10:
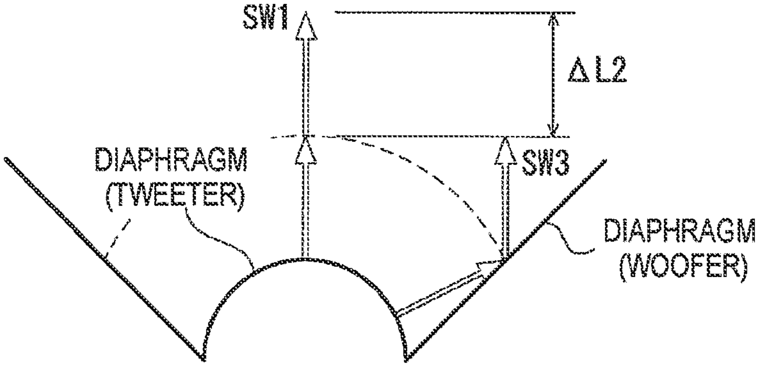
FIG. 10 is a schematic diagram of a speaker showing a second problem occurring in a speaker of a comparative example in which a phase plug is not provided.

In addition, as shown in FIG. 10, the sound wave generated from the diaphragm of the tweeter has a reaching distance different depending on whether to be reflected by the diaphragm of the woofer. For example, a reaching distance difference ΔL2 is generated between the sound wave SW1 generated from the central portion of the diaphragm of the tweeter and the sound wave SW3 propagated from the diaphragm of the tweeter toward the diaphragm of the woofer and reflected by the diaphragm of the woofer. The reaching distance difference ΔL2 is determined by the inclination angle of the diaphragm of the woofer with respect to the front-rear direction of the speaker.

Due to the reaching distance difference ΔL2, a phase shift close to 180 degrees occurs at a certain frequency at the measurement position in front of the speaker, and the sound pressure level at the frequency decreases. As a result, a user in front of the speaker may feel insufficient sound pressure in a certain sound range.

Figure 11:
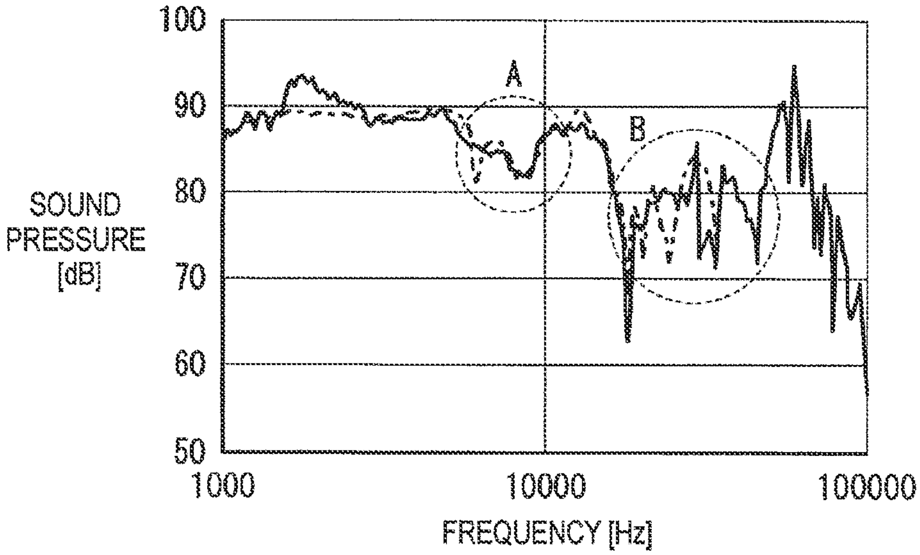
FIG. 11 is a diagram showing sound pressure-frequency characteristics of a speaker of a comparative example in which a phase plug is not provided.

FIG. 11 is a diagram showing sound pressure-frequency characteristics of a speaker of a comparative example in which a phase plug is not provided. It should be noted that in FIG. 11, the solid line indicates a measured value, and the one-clot chain line indicates a simulation value.

As shown in FIG. 11, in the case of the speaker of the comparative example without the phase plug, a dip occurs in the sound range A of 8000 to 9000 Hz, and a decrease in the sound pressure level occurs in the high sound range of 16000 Hz or more. It should be noted that "dip" means that the sound pressure level in a certain sound range is lower than the sound pressure level in the surrounding sound range. Thus, when there is no phase plug, a decrease in the sound pressure level occurs in some frequency bands, and as a result, the frequency characteristics of the speaker deteriorate. The dip in the sound range A is caused by the second problem shown in FIG. 10, and the decrease in the sound pressure level in the sound range B is caused by the first problem shown in FIG. 9. It should be noted that a general human audible range is a range of 20 to 20000 Hz.

In order to suppress such deterioration in sound quality, the phase plug 24 in the speaker 10 of the present first embodiment has a plurality of features as described above and as shown in FIG. 4.

First, effects of the rear surface 24*b* of the phase plug 24 will be described with reference to FIG. 12.

Figure 12:
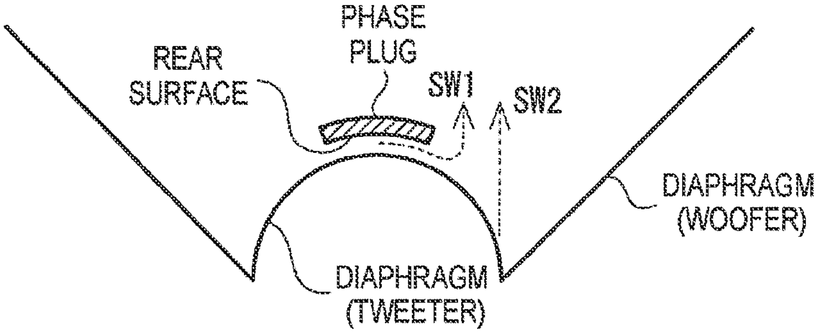
FIG. 12 is a schematic diagram of a speaker showing effects due to the rear surface of the phase plug according to the first embodiment.

FIG. 12 is a schematic diagram of a speaker showing effects due to the rear surface of the phase plug according to the first embodiment.

As described above, and as shown in FIG. 4, the rear surface 24*b* of the phase plug 24 faces a central portion of the front surface 38*a* of the diaphragm 38 of the tweeter 18 at a constant interval d in parallel. As a result, as shown in FIG. 12, the sound wave SW1 generated from the central portion on the front surface of the diaphragm 38 of the tweeter 18 facing the rear surface 24*b* of the phase plug 24 propagates outward through the gap between the phase plug 24 and the diaphragm 38, and propagates forward after exiting from the gap. As a result, the first problem shown in FIG. 9 can be solved, that is, a reaching distance difference between the sound wave SW1 generated from the central portion facing the phase plug and the sound wave SW2 generated from the outer portion not facing the phase plug becomes small.

Next, effects due to the side surface 24*c* of the phase plug 24 will be described with reference to FIGS. 13, 14A, and 14B.

Figure 13:
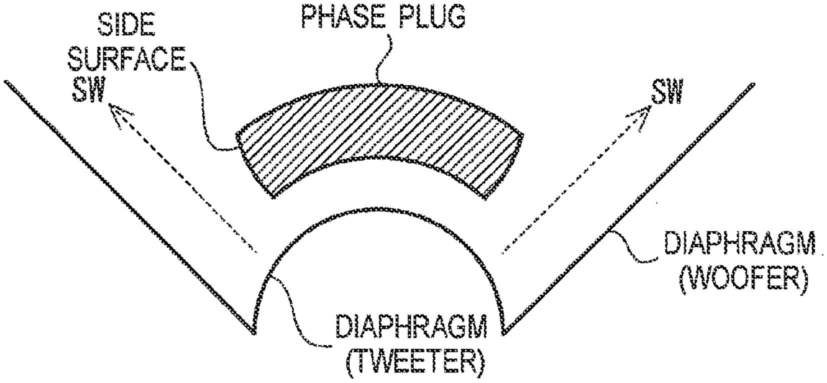
FIG. 13 is a schematic diagram of a speaker showing effects due to the side surface of the phase plug according to the first embodiment.

FIG. 13 is a schematic diagram of a speaker showing effects due to the side surface of the phase plug according to the first embodiment. In addition, FIG. 14A is a sound pressure distribution diagram in the speaker of the first embodiment. Furthermore, FIG. 14B is a sound pressure distribution diagram in a speaker of a comparative example including a dish-shaped phase plug. It should be noted that in FIGS. 14A and 14B, broken lines indicate boundaries between different sound pressure levels.

As shown in FIG. 4, the front surface 24*a* of the phase plug 24 is larger than the rear surface 24*b* thereof as viewed in the front-rear direction of the speaker 10. In addition, therefore, the side surface 24*c* of the phase plug 24 at least partially includes an inclined surface 24*f* extending outward while extending forward. In addition, in the case of the present first embodiment, the inclined surface 24*f* is a curved surface curved outward in a protruding manner as viewed in a direction orthogonal to the front-rear direction of the speaker 10.

With the side surface 24*c* of this phase plug 24, as shown in FIG. 13, the sound waves generated from different positions of the diaphragm 38 of the tweeter 18 are directed not forward but toward the inner circumferential surface 26*a* of the diaphragm 26 of the woofer 16. Accordingly, the sound waves from the diaphragm 38 of the tweeter 18 propagate toward the inner circumferential surface 26*a* of the diaphragm 26 of the woofer 16, and then propagate forward along the inner circumferential surface 26*a*. That is, both the sound wave generated from the central portion of the diaphragm 38 of the tweeter 18 and the sound wave generated from the outer portion propagate along substantially the same path.

Figure 14A:
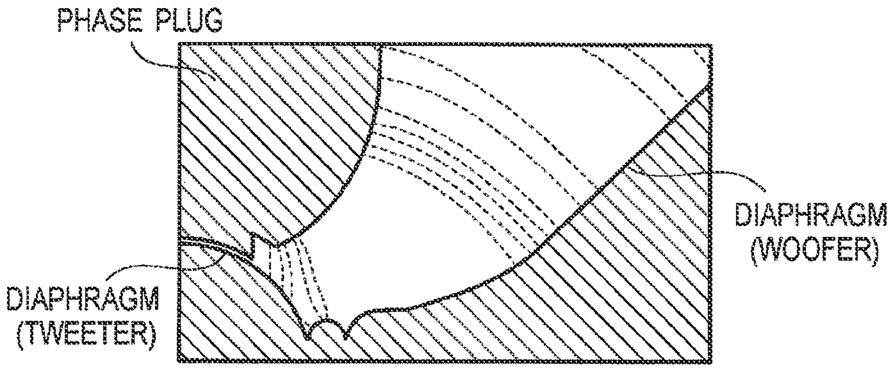
FIG. 14A is a sound pressure distribution diagram in the speaker of the first embodiment.
Figure 14B:
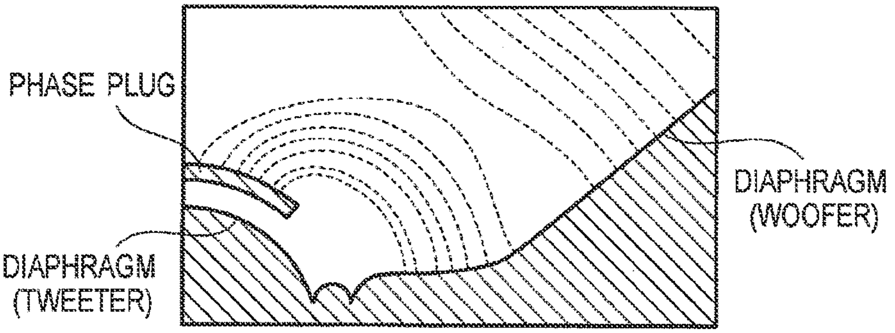
FIG. 14B is a sound pressure distribution diagram in a speaker of a comparative example including a dish-shaped phase plug.

In addition, as can be seen from the sound pressure distribution diagram shown in FIG. 14A, due to the side surface 24*c* of the phase plug 24, the sound wave is suppressed (delayed) in diffraction toward the front of the phase plug. As a result, the sound wave propagates along the diaphragm of the woofer while maintaining the sound pressure level. On the other hand, in the case of the comparative example shown in FIG. 14B, since the phase plug has a thin dish shape, the sound wave is diffracted toward the front of the phase plug. As a result, the sound wave propagates along the inner circumferential surface of the diaphragm of the woofer while being decreased in the sound pressure level.

Figure 15:
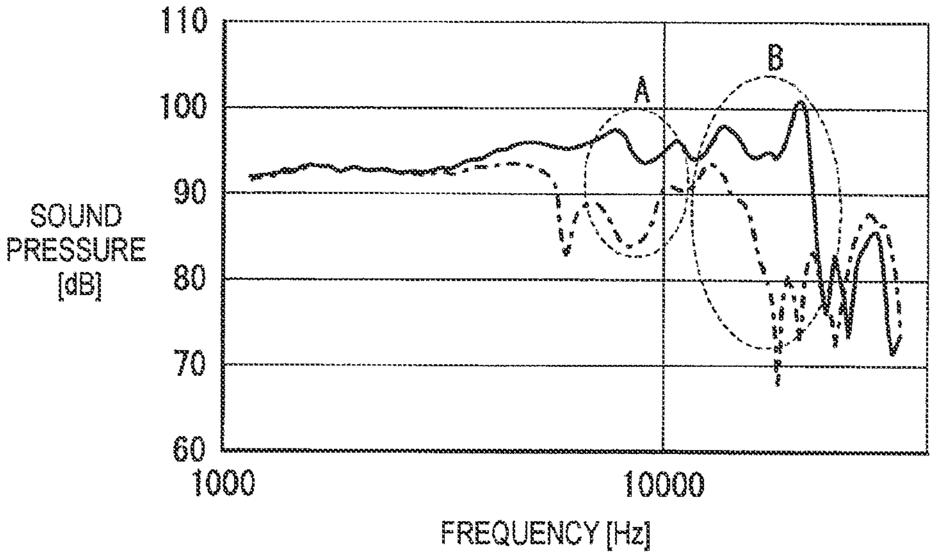
FIG. 15 is a diagram showing simulation values of the sound pressure-frequency characteristics (solid line) of the speaker according to the first embodiment and the sound pressure-frequency characteristics (one-dot chain line) of the speaker of the comparative example not including the phase plug.

FIG. 15 shows simulation values of the sound pressure-frequency characteristics (solid line) of the speaker of the first embodiment and the sound pressure-frequency characteristics (one-dot chain line) of the speaker of the comparative example not including the phase plug.

As shown in FIG. 15, due to the side surface 24*c* of the phase plug 24, occurrence of a dip in the sound range A of 8000 to 9000 Hz is suppressed. As a result, the sound quality is improved, and in particular, the color of the sound is improved.

It should be noted that in the case of the present first embodiment, as shown in FIG. 4, the inclined surface 24*f* on the side surface 24*c* of the phase plug 24 is a curved surface curved outward in a protruding manner as viewed in a direction orthogonal to the front-rear direction of the speaker 10, but the present invention is not limited thereto. The inclined surface 24*f* may be linear as viewed in a direction orthogonal to the front-rear direction of the speaker 10. It should be noted that in order to suppress the diffraction of the sound wave toward the front of the phase plug (to delay the occurrence of the diffraction), a curved surface is preferable. In addition, the entire side surface 24*c* may be the inclined surface 24*f*.

In addition, in the case of the present first embodiment, as shown in FIG. 4, the side surface 24*c* of the phase plug 24 includes a wall surface 24*i* extending at least in the front-rear direction of the speaker 10 from the rear surface 24*b*, and an eaves-soffit-shaped wall surface 24*j* extending at least outward from the wall surface 24*i* and connected to the inclined surface 24*f*. In the case of the present first embodiment, the wall surface 24*i* extends outward while extending forward from the rear surface 24*b* toward the wall surface 24*j*, and the wall surface 24*j* extends rearward while extending outward from the wall surface 24*i* toward the inclined surface 24*f*. The sound wave exiting from between the rear surface 24*b* and the diaphragm 38 travels along the wall surface 24*i* from the outer circumferential end of the rear surface 24*b*, and then travels along the wall surface 24*j* from the front end of the wall surface 24*i*.

The sound wave traveling along the wall surface 24*i* precedes the sound wave traveling along the diaphragm 26 of the woofer 16. However, the sound wave traveling along the wall surface 24*i* then travels outward along the wall surface 24*i*. Meanwhile, the sound wave traveling along the diaphragm 26 of the woofer 16 catches up. Specifically, at the timing when the sound wave traveling along the wall surface 24*j* reaches the inclined surface 24*f*, the sound wave traveling along the diaphragm 26 of the woofer 16 reaches the substantially same front-rear direction position as the connection place between the wall surface 24*j* and the inclined surface 24*f*. Thereafter, the sound wave traveling along the phase plug 24 and the sound wave traveling along the diaphragm 26 of the woofer 16 travel forward in a state of being in phase. The path length of the sound wave traveling along the phase plug 24 can be adjusted by appropriately adjusting the shapes and lengths of the wall surfaces 24*i* and 24*j* positioned between the rear surface 24*b* and the inclined surface 24*f*. As a result, the entire sound wave can travel toward the front of the speaker 10 with the phases in phase.

Next, effects due to the front surface 24*a* of the phase plug 24 will be described with reference to FIGS. 16A and 16B.

Figure 16A:
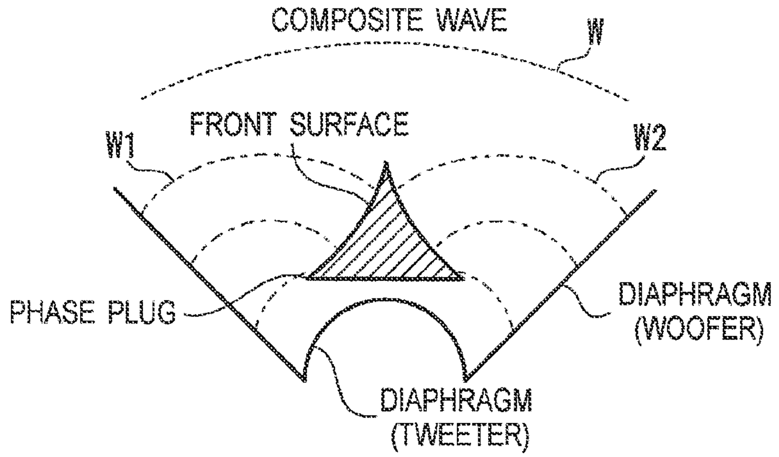
FIG. 16A is a diagram showing propagation of a wave front in the speaker of the first embodiment.
Figure 16B:
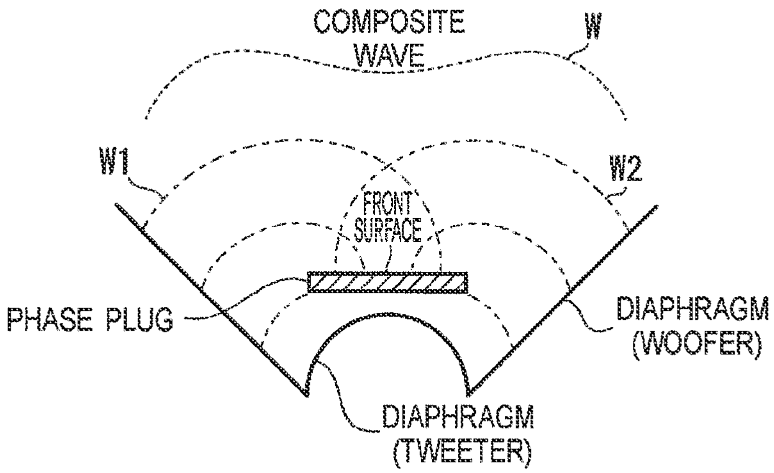
FIG. 16B is a diagram showing propagation of a wave front in a speaker of a comparative example including a flat plate-shaped phase plug.

FIG. 16A is a diagram showing propagation of a wave front in the speaker of the first embodiment. In addition, FIG. 16B is a diagram showing propagation of a wave front in a speaker of a comparative example including a flat plate-shaped phase plug. It should be noted that, in FIGS. 16A and 16B, two different wave fronts W1 and W2 are indicated by a one-dot chain line and a two-dot chain line, respectively, and a wave front W of a composite wave thereof is indicated by a broken line.

As shown in FIG. 4, in the case of the present first embodiment, the front surface 24*a* of the phase plug 24 is a conical protruding surface protruding forward as viewed in a direction orthogonal to the central axis C. The conical front surface 24*a* has a conical surface curved inward in a protruding manner.

According to the front surface of this phase plug, and according to the property that the sound wave propagates along the surface of the object so that the wave front is orthogonal to the surface of the object, when two different wave fronts W1 and W2 merge in front of the phase plug as shown in FIG. 16A, the wave front W of the composite wave becomes a wave front that uniformly curves forward in a protruding manner over the entire area. On the other hand, as shown in FIG. 16B, when the phase plug is plate-shaped, two different wave fronts W1 and W2 interfere on the front surface of the phase plug, and as a result, the wave front W of the composite wave has a concave wave front in a portion propagating in front of the phase plug.

The front surface 24*a* of this phase plug 24 suppresses a decrease in the sound pressure level in the high sound range B of 15000 Hz or more as shown in FIG. 15. As a result, sound quality is improved, and in particular, sound extension is improved.

Next, effects of the plurality of ribs 24*g* of the phase plug 24 will be described.

As described above, and as shown in FIG. 4, each of the plurality of ribs 24*g* extends in the radiation direction with respect to the center line C as viewed in the front-rear direction of the speaker 10. Furthermore, each of the plurality of ribs 24*g* includes a facing surface 24*h* that faces the front surface 38*a* of the diaphragm 38 at a constant interval d in parallel.

Due to the plurality of ribs 24*g*, sound waves generated from various places of the diaphragm 38 have a ratio of directly traveling forward increasing as generation positions thereof move away from the center, That is, as the generation position moves away from the center, the number of sound waves immediately propagating forward through the space between the plurality of ribs 24*g* increases, and the number of sound waves traveling forward after propagating through the gap between the facing surface 24*h* of the rib 24*g* and the diaphragm 38 decreases. In short, as the generation position is farther from the center, the number of short-circuiting sound waves increases and the number of detouring sound waves decreases. Specifically, the propagation path of the sound wave generated from the portion of the diaphragm 38 facing the facing surface 24*h* of the rib 24*g* is longer than the propagation path of the sound wave generated from the portion of the diaphragm 38 not facing the facing surface 24*h* and propagating directly forward because the sound wave travels forward after exiting the gap between the facing surface 24*h* and the diaphragm 38. Since the length of the propagation path of the sound wave is variously different as described above, the sound pressure level at each frequency reaching the measurement position in front of the speaker is flattened.

Figure 17:
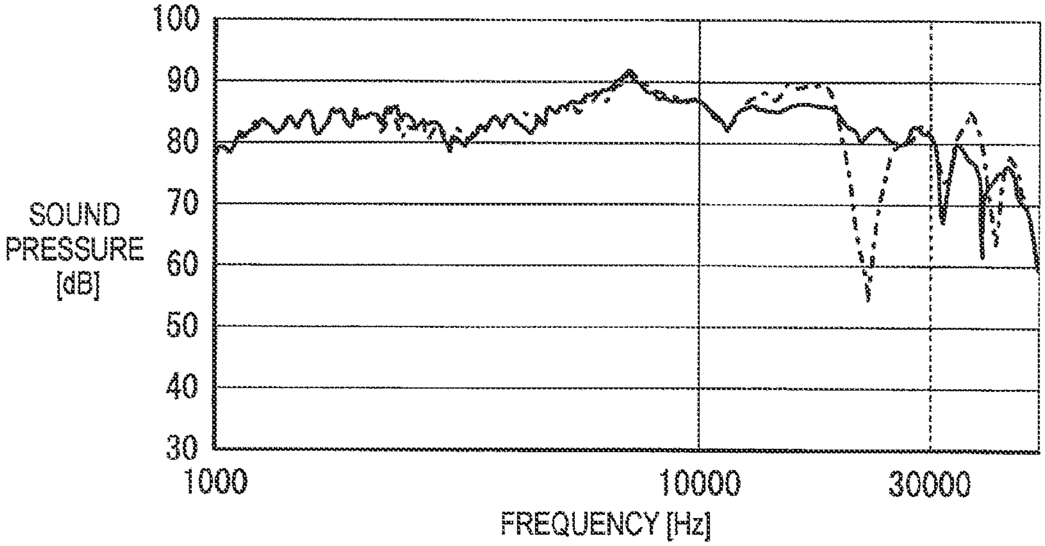
FIG. 17 is a diagram showing simulation values of the sound pressure-frequency characteristics (solid line) of a speaker including a phase plug including a plurality of ribs and the sound pressure-frequency characteristics (one-dot chain line) of a speaker including a phase plug not including a plurality of ribs.
Figure 24:
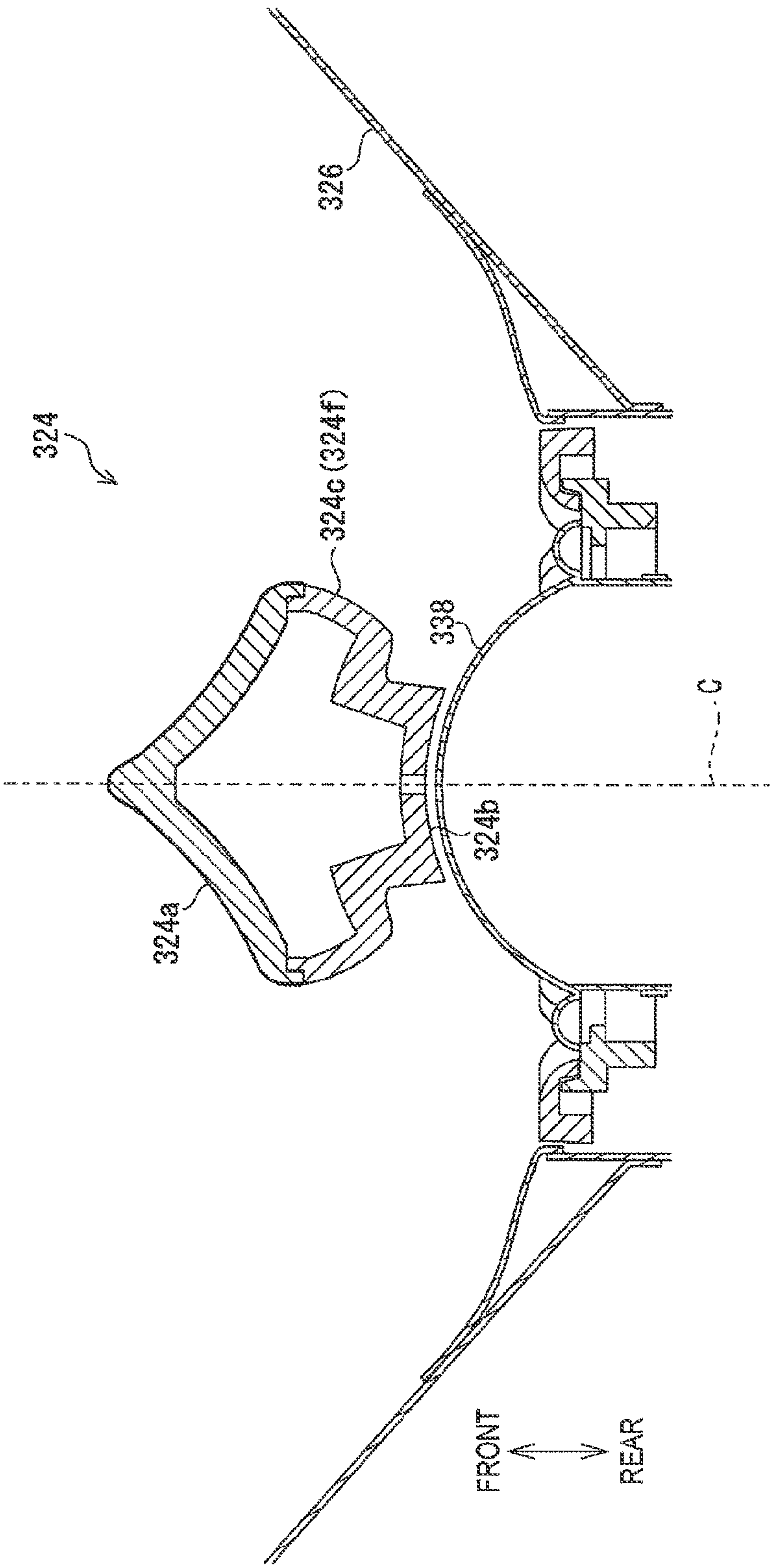
FIG. 24 is a partially enlarged cross-sectional view of a speaker including a phase plug according to another embodiment.

FIG. 17 shows simulation values of the sound pressure-frequency characteristics (solid line) of a speaker including a phase plug including a plurality of ribs and the sound pressure-frequency characteristics (one-dot chain line) of a speaker including a phase plug not including a plurality of ribs. It should be noted that a phase plug not including a plurality of ribs indicated by the one-dot chain line is shown in FIG. 24 described below.

As shown in FIG. 17, since the phase plug includes a plurality of ribs, the sound pressure level at each frequency reaching the measurement position in front of the speaker is flattened in the sound range of 30,000 Hz or less, and the sound quality is improved.

It should be noted that in the case of the present first embodiment, in order to finely adjust the degree of flattening of the sound pressure level and the sound pressure level at a specific frequency, as shown in FIGS. 7 and 8, the wall thickness of each of the plurality of ribs 24*g* and the width of the facing surface 24*h* of each of the plurality of ribs 24*g* are finely adjusted. Since the wall thickness increases toward the front, the length of the propagation path of the sound wave propagating between the plurality of ribs 24*g*, specifically, the sound wave propagating near the rib 24*g* becomes slightly larger than the sound wave propagating through the center between the ribs. In addition, since the width of the facing surface 24*h* decreases toward the outside, a part of the sound wave propagating through the gap between the facing surface 24*h* and the diaphragm 38 escapes to between the plurality of ribs before reaching the outer end of the facing surface 24*h*.

According to the first embodiment as described above, the sound quality can be further improved in the speaker including the dome-shaped diaphragm and the phase plug disposed in front thereof.

Second Embodiment

In the case of the first embodiment described above, as shown in FIG. 4, the plurality of ribs 24*g* do not protrude outward beyond the outer circumferential edge of the front surface 24*a* of the phase plug 24 as viewed in the front-rear direction of the speaker 10. Therefore, the sound wave propagating forward between the plurality of ribs 24*g* is reflected by the side surface 24*c* and propagates toward the inner circumferential surface 26*a* of the diaphragm 26 of the woofer 16. Unlike this, in the speaker according to the present second embodiment, the sound wave propagating forward between the plurality of ribs 24*g* is output forward from the speaker as it is. Since being substantially the same except for this different point, the present second embodiment will be described focusing on the different point.

Figure 18:
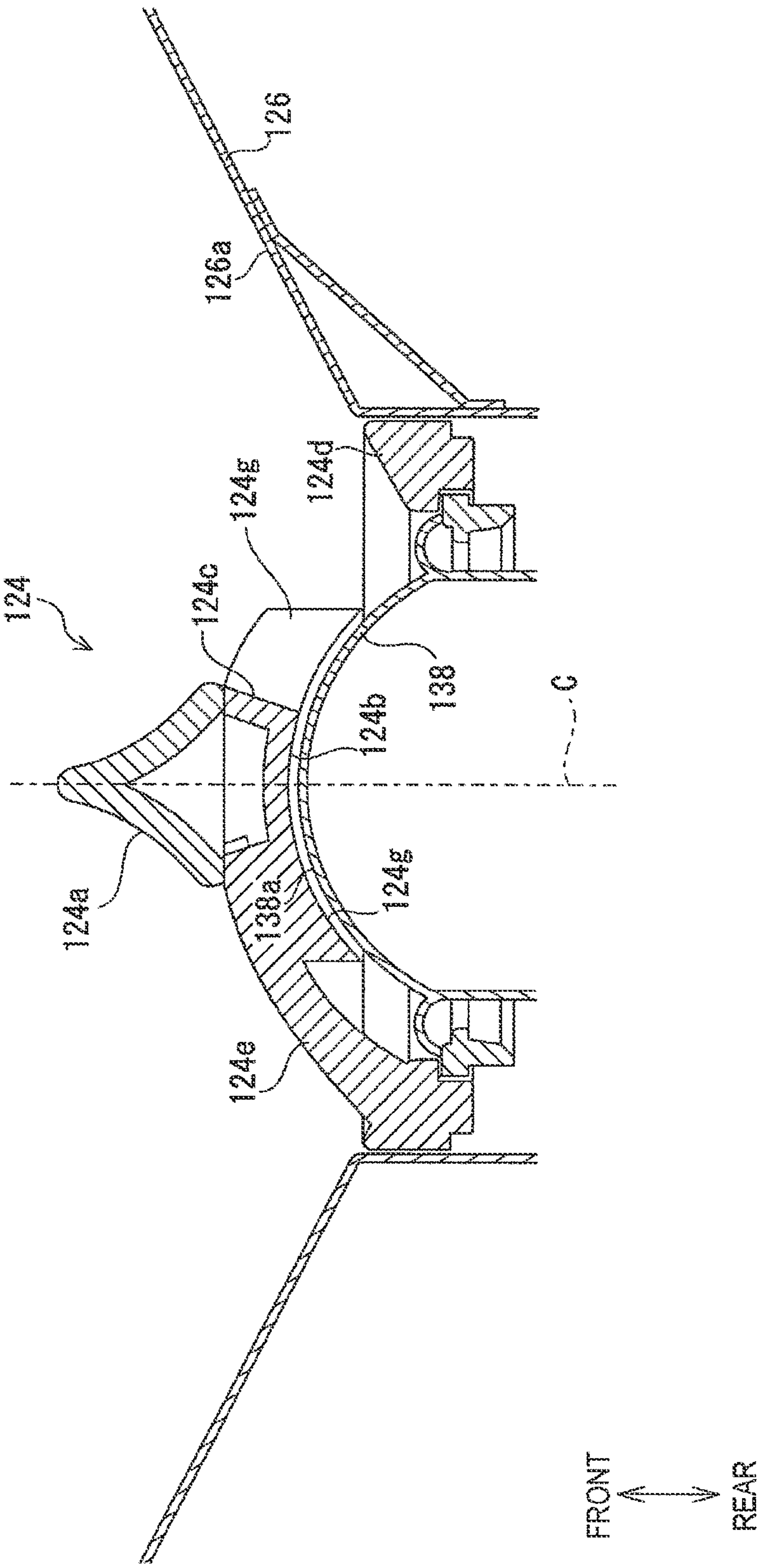
FIG. 18 is a partially enlarged cross-sectional view of a speaker including a phase plug according to a second embodiment.
Figure 19:
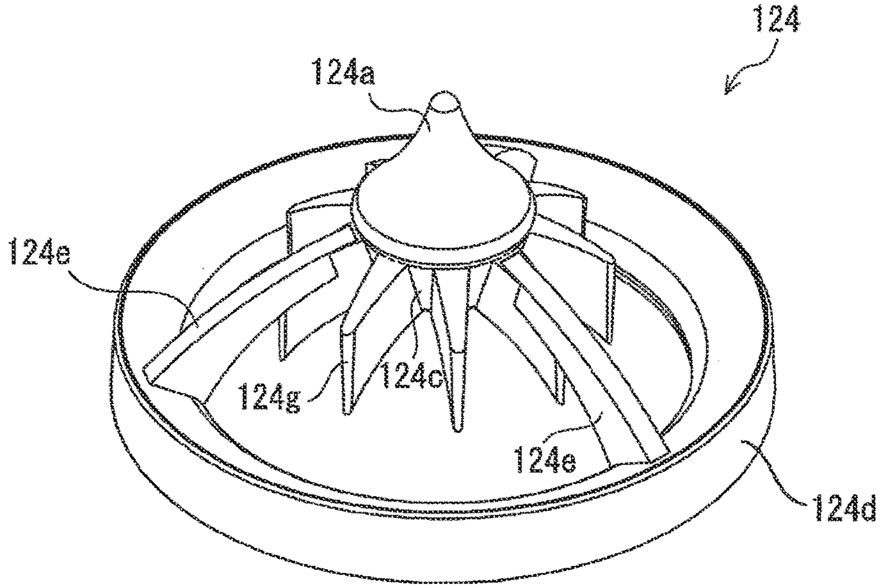
FIG. 19 is a front perspective view of the phase plug according to the second embodiment.
Figure 20:
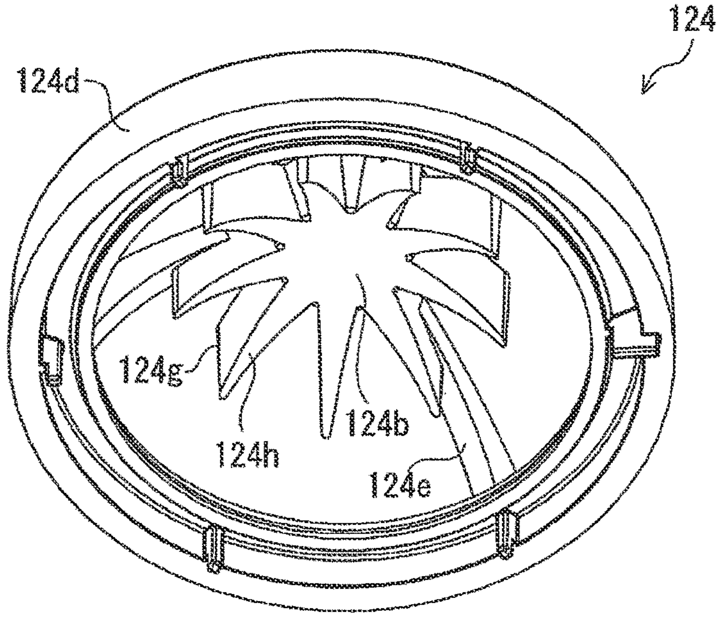
FIG. 20 is a rear perspective view of the phase plug according to the second embodiment.
Figure 21:
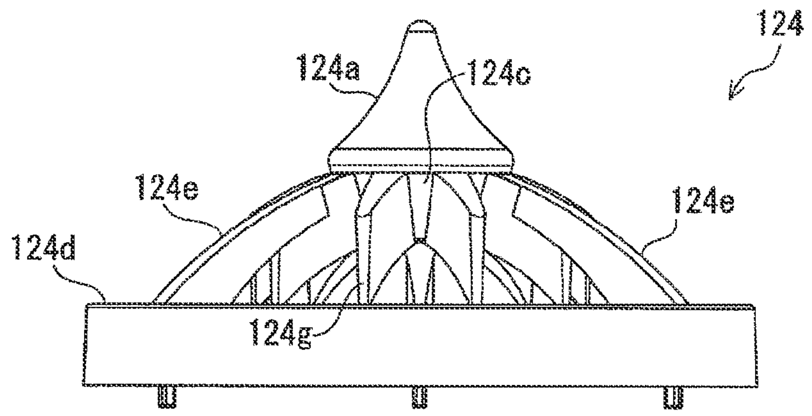
FIG. 21 is a side view of the phase plug according to the second embodiment.
Figure 22:
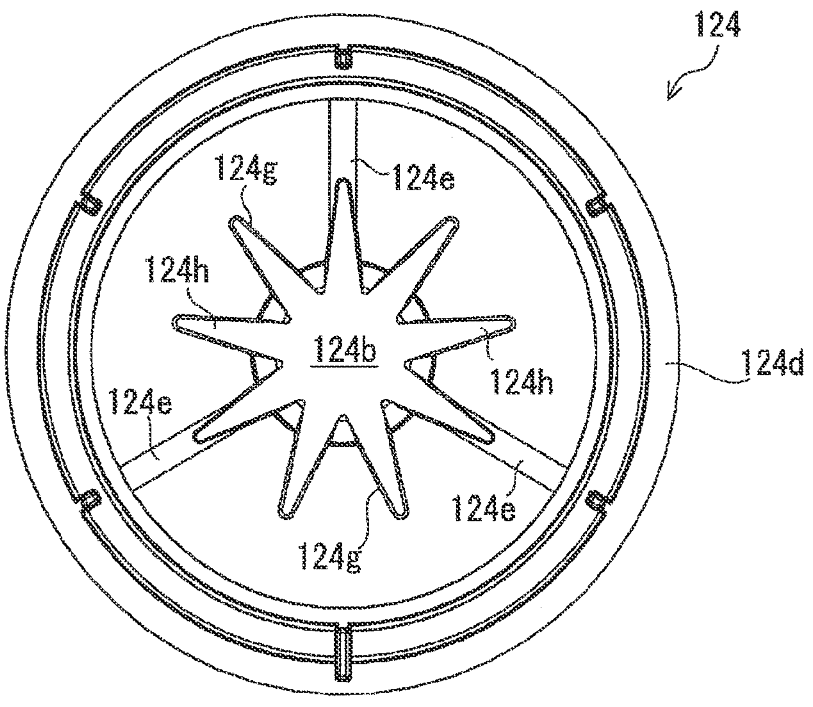
FIG. 22 is a rear view of the phase plug according to the second embodiment.

FIG. 18 is a partially enlarged cross-sectional view of the speaker including the phase plug according to the second embodiment. In addition, FIGS. 19 to 22 are a front perspective view, a rear perspective view, a side view, and a rear view of the phase plug according to the second embodiment.

As shown in FIGS. 18 to 22, the phase plug 124 in the speaker according to the present second embodiment includes a front surface 124*a* facing forward, a rear surface 124*b* facing the front surface 138*a* of the diaphragm 138 of the tweeter, a side surface 124*c* connecting the front surface 124*a* and the rear surface 124*b*, an annular attachment portion 124*d* attached to the magnetic circuit, and a plurality of leg portions 124*e* connecting the side surface 124*c* and the attachment portion 124*d*.

In the phase plug 124 according to the present second embodiment, the front surface 124*a* and the rear surface 124*b* have substantially the same size as viewed in the front-rear direction of the speaker. Therefore, the side surface 124*c* extends outward while extending forward, and includes a flat inclined surface as viewed in a direction orthogonal to the front-rear direction. However, the inclined surface has a small inclination angle with respect to the central axis C of the speaker, and is substantially parallel to the central axis. Therefore, the side surface 124*c* of the phase plug 124 according to the present second embodiment hardly plays a role of directing the sound wave generated from the diaphragm 138 of the tweeter toward the inner circumferential surface 126*a* of the diaphragm 126 of the woofer, unlike the outward protruding curved-surface-shaped side surface 24*c* of the phase plug 24 according to the first embodiment described above.

In addition, as viewed in the front-rear direction of the speaker, the size of the front surface 124*a* of the phase plug 124 is smaller than that of the diaphragm 138. Furthermore, the plurality of ribs 124*g* provided on the side surface 124*c* of the phase plug 124 protrude outward beyond the outer circumferential edge of the front surface 124*a* as viewed in the front-rear direction of the speaker, and do not substantially protrude in the direction from the side surface 124*c* toward the diaphragm 138. Then, each of the plurality of ribs 124*g* includes a facing surface 124*h* that faces the front surface 138*a* of the diaphragm 138 at a constant interval in parallel. It should be noted that in the plurality of ribs 124*g*, some ribs (three ribs in the case of the present second embodiment) are integrated with the plurality of leg portions 124*e* in an overlapping manner as viewed in the front-rear direction of the speaker.

According to the plurality of ribs 124*g*, sound waves propagating forward between the plurality of ribs 124*g* (that is, a sound wave generated from a portion of the diaphragm 138 not facing the facing surface 124*h* of the rib 124*g* and a sound wave after generated from a portion of the diaphragm 138 facing the facing surface 124*h* and exiting the gap between the facing surface 124*h* and the diaphragm 138) propagate forward as they are while maintaining the sound pressure level without being substantially reflected toward the diaphragm 126 of the woofer by the side surface 124*c* of the phase plug 124. Accordingly, a decrease in the sound pressure level is suppressed at the measurement position in front of the speaker. As a result, it is possible to complement the role of the side surface 24*c* of the phase plug 24 in the first embodiment described above, that is, the role of suppressing the occurrence of a dip in the sound range of 8000 to 9000 Hz, Therefore, according to the plurality of ribs 124*g*, it is also possible to provide the side surface 124*c* of the phase plug 124 parallel to the central axis C of the speaker.

It should be noted that the configuration of the phase plug 124 in the second embodiment is effective when the diaphragm 126 of the woofer has a flat plate or a shape with a loose inclination angle, that is, when the diaphragm of the tweeter is not disposed in the diaphragm of the woofer whose inner diameter increases toward the front.

Similarly to the first embodiment described above, also in the second embodiment as described above, sound quality can be further improved in a speaker including a dome-shaped diaphragm and a phase plug disposed in front of the diaphragm.

Third Embodiment

The present third embodiment is an improved form of the second embodiment described above. Therefore, the present third embodiment will be described focusing on this different point.

Figure 23:
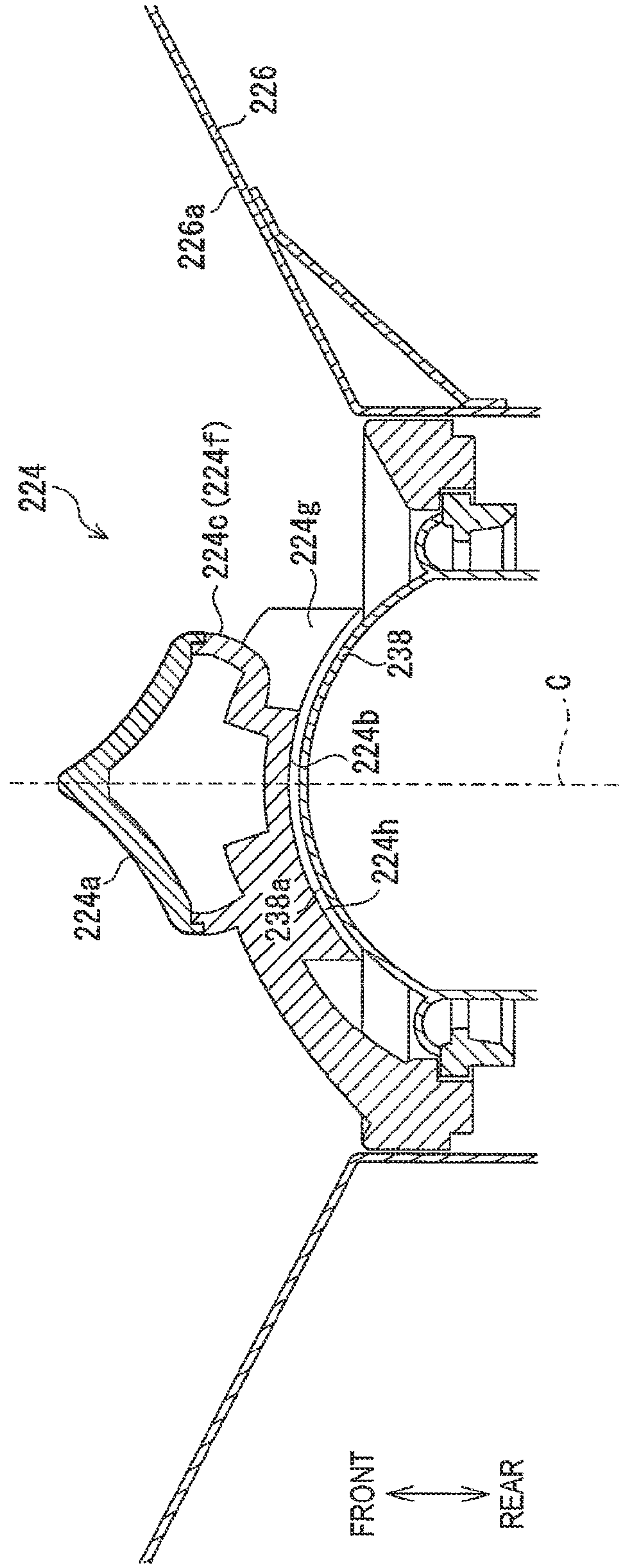
FIG. 23 is a partially enlarged cross-sectional view of a speaker including a phase plug according to a third embodiment.

FIG. 23 is a partially enlarged cross-sectional view of the speaker including the phase plug according to the third embodiment.

As shown in FIG. 23, the phase plug 224 in a speaker according to the present third embodiment includes a front surface 224*a* facing forward, a rear surface 224*b* facing the front surface 238*a* of the diaphragm 238 of the tweeter, and a side surface 224*c* connecting the front surface 224*a* and the rear surface 224*b*.

In the phase plug 224 according to the present third embodiment, at least a part of the side surface 224*c* thereof includes an inclined surface 224*f* extending outward while extending forward, similarly to the side surface 24*c* in the phase plug 24 according to the first embodiment described above. The inclined surface 224*f* is a curved surface curved outward in a protruding manner as viewed in a direction orthogonal to the front-rear direction of the speaker.

In addition, as viewed in the front-rear direction of the speaker, the size of the front surface 224*a* of the phase plug 224 is smaller than that of the diaphragm 238. In addition, the plurality of ribs 224*g* provided on the side surface 224*c* of the phase plug 224 protrude outward beyond the outer circumferential edge of the front surface 224*a* as viewed in the front-rear direction of the speaker. In addition thereto, the plurality of ribs 224*g* protrude toward the diaphragm 238.

According to the phase plug 224, an effect by the side surface 24*c* in the phase plug 24 according to the first embodiment and an effect by the plurality of ribs 124*g* in the phase plug 124 according to the second embodiment can be obtained. That is, the sound wave generated from the portion of the diaphragm 238 overlapping the front surface 224*a* of the phase plug 224 can be directed to the diaphragm 226 of the woofer as viewed in the front-rear direction of the speaker. In addition, as viewed in the front-rear direction of the speaker, on the outer side of the front surface 224*a* of the phase plug 224, the sound wave generated from the portion of the diaphragm 238 not facing the facing surface 224*h* of the rib 224*g* passes forward between the plurality of ribs 224*g* and propagates forward as it is. Similarly thereto, the sound wave after generated is from the portion of the diaphragm 238 facing the facing surface 224*h* of the plurality of ribs 224*g* and exiting from the gap between the facing surface 224*h* and the diaphragm 238 also passes forward between the plurality of ribs 224*g* and propagates forward.

Similarly to the first embodiment described above, also in the third embodiment as described above, sound quality can be further improved in a speaker including a dome-shaped diaphragm and a phase plug disposed in front of the diaphragm.

As described above, although the present disclosure has been described with reference to three embodiments of the first to third embodiments, the embodiment of the present disclosure is not limited thereto.

For example, each of the phase plugs of the speakers according to the above-described first to third embodiments includes a plurality of ribs. However, the embodiment of the present disclosure is not limited thereto.

FIG. 24 is a partially enlarged cross-sectional view of the speaker including the phase plug according to another embodiment.

As shown in FIG. 24, a phase plug 324 in a speaker according to another embodiment is substantially the same as the phase plug 24 according to the first embodiment except that a plurality of ribs are not provided. That is, as viewed in the front-rear direction of the speaker, the front surface 324*a* is larger than the rear surface 324*b*, whereby the side surface 324*c* includes the inclined surface 324*f* extending outward while extending at least partially forward. In addition, the front surface 324*a* is a conical protruding surface as viewed in a direction orthogonal to the central axis C. The conical front surface 324*a* has a conical surface curved inward in a protruding manner.

According to the phase plug 324 according to the other embodiment, although it cannot be expected to flatten the sound pressure level due to the plurality of ribs being not provided, it is possible to suppress the occurrence of dips in the sound range of 8000 to 9000 Hz with the side surface 324*c*. In addition thereto, it is possible to suppress a decrease in the sound pressure level in the high sound range of 15000 Hz or more with the front surface 324*a*, That is, it is possible to partially enjoy the sound quality improving effect by the phase plug 24 according to the first embodiment.

It should be noted that regarding the plurality of ribs, in the case of the phase plugs 24 and 124 of the first and second embodiments described above, as shown in FIGS. 5 and 19, the number of the plurality of ribs 24*g* and 124*g* is larger than the number of the plurality of leg portions 24*e* and 124*e*. However, the embodiment of the present disclosure is not limited thereto. The number of the plurality of ribs and the number of the plurality of leg portions may be the same. In this case, the ribs and the leg portions may be integrated to overlap each other as viewed in be front-rear direction of the speaker.

In addition, in the case of the above-described first embodiment. as shown in FIG. 4, the front surface 24*a* of the phase plug 24 is a conical protruding surface as viewed in a direction orthogonal to the central axis C, and the conical front surface 24*a* has a conical surface curved inward in a protruding manner. However, the embodiment of the present disclosure is not limited thereto.

Figure 25:
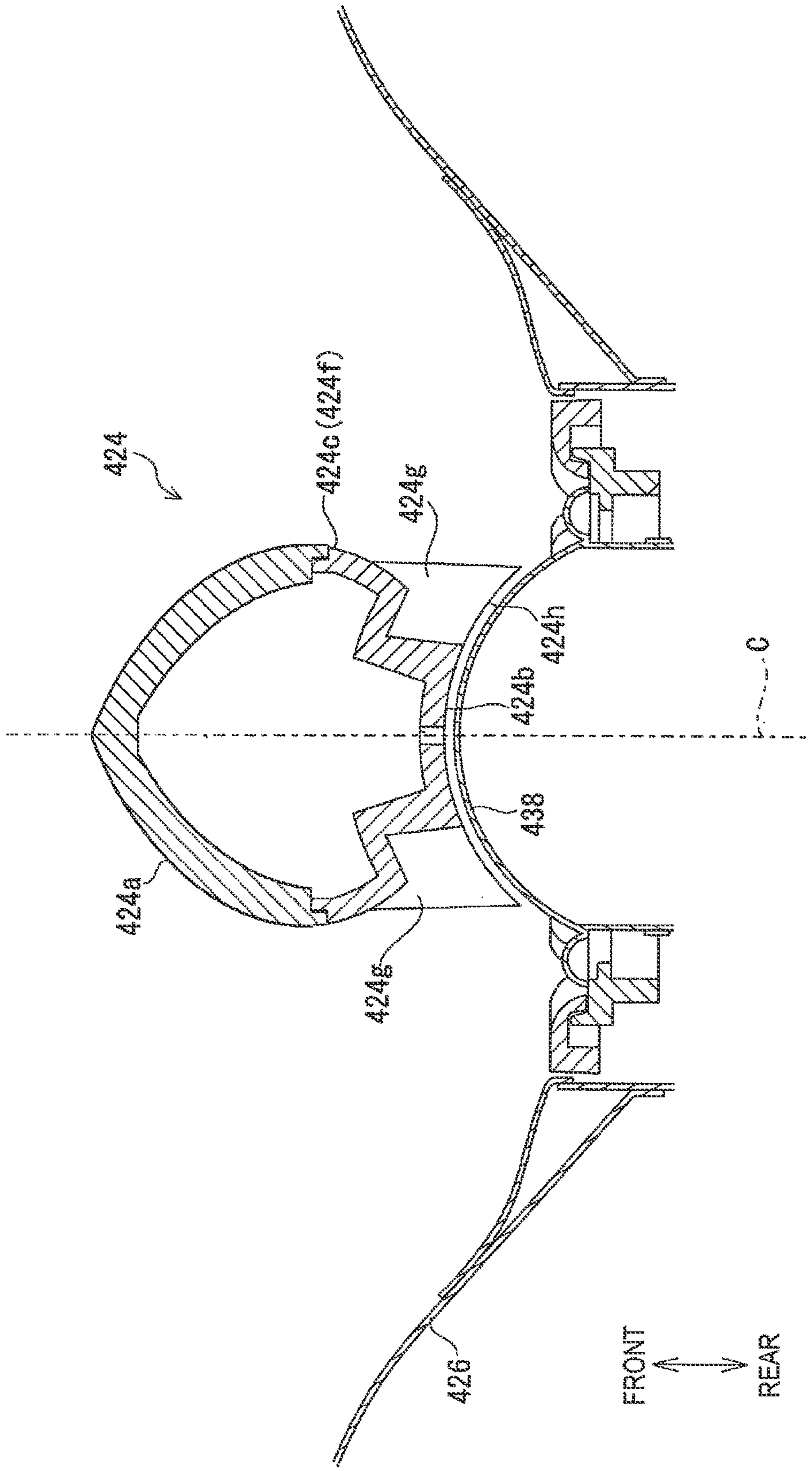
FIG. 25 is a partially enlarged cross-sectional view of a speaker including a phase plug according to still another embodiment.

FIG. 25 is a partially enlarged cross-sectional view of a speaker including a phase plug according to still another embodiment.

As shown in FIG. 25, a front surface 424*a* of the phase plug 424 in the speaker according to still another embodiment is a conical protruding surface as viewed in a direction orthogonal to the central axis C, similarly to the front surface 24*a* of the phase plug 24 according to the first embodiment shown in FIG. 4. However, the conical front surface 424*a* of the phase plug 424 has a conical surface curved outward in a protruding manner. In addition, the diaphragm 426 of the woofer has a shape corresponding to the front surface 424*a* of the phase plug 424, that is, a shape curved in a protruding manner toward the center side.

That is, as shown in FIG. 16A, in front of the phase plug, in order to generate a wave front of a composite wave uniformly protruding forward over the entire area, the front surface shape of the phase plug and the diaphragm shape of the woofer need to cooperate with each other, Therefore, as shown in FIG. 25, the front surface shape of the phase plug is changed based on the shape of the diaphragm of the woofer.

Furthermore, in the case of the first embodiment described above, the speaker 10 is a coaxial speaker including the woofer 16 and the tweeter 18 as shown in FIG. 4, However, the embodiment of the present disclosure is not limited thereto, That is, the tubular member in which the dome-shaped diaphragm is disposed inside and the inner diameter increases toward the front is not limited to the diaphragm of the woofer, and may be, for example, a horn of the enclosure.

That is, an embodiment according to the present disclosure is, in a broad sense, a speaker including: a diaphragm having a dome shape curved forward in a protruding manner; a tubular member having the diaphragm disposed inside, the tubular member having an inner diameter increasing toward a front; and a phase plug disposed in front of a front surface of the diaphragm. The phase plug includes: a front surface facing forward, a rear surface facing a central portion on a front surface of the diaphragm at a constant interval in parallel, and a side surface connecting the front surface and the rear surface. The front surface of the phase plug is larger than a rear surface of the phase plug as viewed in a front-rear direction of a speaker. At least a part of the side surface of the phase plug has an inclined surface that extends outward while extending forward, faces an inner circumferential surface of the tubular member and a front surface of the diaphragm, and directs a sound wave generated from the diaphragm toward an inner circumferential surface of the tubular member.

In addition, another embodiment of the present disclosure is, in a broad sense, a speaker including: a diaphragm having a dome shape curved forward in a protruding manner; and a phase plug disposed in front of a front surface of the diaphragm. The phase plug includes: a front surface facing forward, a rear surface facing a central portion on a front surface of the diaphragm at a constant interval in parallel, and a side surface connecting the front surface and the rear surface. The phase plug includes a plurality of ribs on the side surface. Each of the plurality of ribs includes a facing surface that faces a front surface of the diaphragm at the constant interval in parallel. Each of the plurality of ribs protrudes outward beyond an outer circumferential edge of the front surface as viewed in a front-rear direction of a speaker.

As described above, the embodiments are described as the exemplification of the technique in the present disclosure. To that end, accompanying drawings and detailed description are provided. Therefore, among the components described in the accompanying drawings and the detailed description, not only the components essential for solving the problem, but also the components not essential for solving the problem may be included in order to exemplify the above technique. Therefore, it should not be recognized that these non-essential components are essential immediately because these non-essential components are described in the accompanying drawings and the detailed description.

In addition, since the above preferred embodiments are for exemplifying the technique in the present disclosure, various changes, substitutions, additions, omissions, and the like can be made within the scope of the claims or the equivalent thereof.

INDUSTRIAL APPLICABILITY

The present disclosure is applicable to a speaker including a dome-shaped diaphragm and a phase plug disposed in front of the diaphragm.

The invention claimed is:

1. A speaker comprising:

a diaphragm having a dome shape curved forward in a protruding manner;

a tubular member having the diaphragm disposed inside, the tubular member having an inner diameter increasing toward a front; and a phase plug disposed in front of a front surface of the diaphragm, wherein the phase plug includes:

a front surface facing forward, a rear surface facing a central portion on the front surface of the diaphragm at a constant interval in parallel with the central portion, and a side surface connecting the front surface and the rear surface, wherein the front surface of the phase plug is larger than the rear surface of the phase plug as viewed in a front-rear direction of the speaker, and wherein at least a part of the side surface of the phase plug has an inclined surface that extends outward while extending forward, faces an inner circumferential surface of the tubular member and the front surface of the diaphragm, and directs a sound wave generated from the diaphragm toward the inner circumferential surface of the tubular member.

2. The speaker according to claim 1, wherein the inclined surface of the phase plug is a curved surface curved outward in a protruding manner.

3. The speaker according to claim 1, wherein the phase plug includes a plurality of ribs protruding from the side surface of the phase plug toward the front surface of the diaphragm, and wherein each of the plurality of ribs includes a facing surface that faces the front surface of the diaphragm in parallel with the front surface of the diaphragm at the constant interval.

4. The speaker according to claim 3, wherein each of the plurality of ribs has a shape in which a wall thickness increases toward the front.

5. The speaker according to claim 3, wherein the facing surface of each of the plurality of ribs has a shape in which a width decreases toward an outer side as viewed in the front-rear direction of the speaker.

6. The speaker according to claim 3, wherein the plurality of ribs protrude outward beyond an outer circumferential edge of the front surface of the phase plug as viewed in the front-rear direction of the speaker.

7. The speaker according to claim 1 wherein the front surface of the phase plug is a conical protruding surface having a conical surface curved inward in a protruding manner.

8. The speaker according to claim 1, wherein the diaphragm having a dome shape is a diaphragm of a tweeter, and wherein the tubular member is a diaphragm of a woofer.

9. A speaker comprising:

a diaphragm having a dome shape curved forward in a protruding manner; and a phase plug disposed in front of a front surface of the diaphragm, wherein the phase plug includes:

a front surface facing forward, a rear surface facing a central portion on the front surface of the diaphragm at a constant interval in parallel with the central portion, and a side surface connecting the front surface and the rear surface, wherein the side surface of the phase plug is located on inside of an outer circumferential edge of the front surface of the phase plug as viewed in a front-rear direction of the speaker, wherein the phase plug includes a plurality of ribs on the side surface of the phase plug, wherein each of the plurality of ribs includes a facing surface that faces the front surface of the diaphragm at the constant interval in parallel with the front surface of the diaphragm, and wherein each of the plurality of ribs protrudes outward beyond an outer circumferential edge of the front surface of the phase plug as viewed in the front-rear direction of the speaker.

10. The speaker according to claim 9, wherein at least a part of the side surface of the phase plug includes an inclined surface extending outward while extending forward, and wherein each of the plurality of ribs protrudes from the side surface toward the front surface of the diaphragm.

11. The speaker according to claim 1, wherein at least a part of the side surface of the phase plug has a first wall surface and a second wall surface, wherein the first wall surface extends at least in the front-rear direction of the speaker from the rear surface, and wherein the second wall surface has an eaves-soffit shape, extends at least outward from the first wall surface, and is connected to the inclined surface.

* * * * *